United States Patent
Nakashima

(10) Patent No.: US 7,896,767 B2
(45) Date of Patent: Mar. 1, 2011

(54) V-RIBBED BELT

(75) Inventor: Eijiro Nakashima, Kobe (JP)

(73) Assignee: Bando Chemical Industries, Ltd., Kobe-Shi, Hyogo (JP)

( * ) Notice: Subject to any disclaimer, the term of this patent is extended or adjusted under 35 U.S.C. 154(b) by 241 days.

(21) Appl. No.: 11/830,105

(22) Filed: Jul. 30, 2007

(65) Prior Publication Data

US 2008/0026897 A1 Jan. 31, 2008

(30) Foreign Application Priority Data

Jul. 28, 2006 (JP) .................................. 2006-206850

(51) Int. Cl.
*F16G 5/00* (2006.01)

(52) U.S. Cl. ........................................ 474/261; 474/263

(58) Field of Classification Search ................. 474/261, 474/263
See application file for complete search history.

(56) References Cited

U.S. PATENT DOCUMENTS

| | | | | |
|---|---|---|---|---|
| 4,127,039 A * | 11/1978 | Hollaway, Jr. | ................. | 474/263 |
| 4,708,702 A * | 11/1987 | Robecchi et al. | ................. | 474/261 |
| 4,798,566 A * | 1/1989 | Sedlacek | ..................... | 474/238 |
| 4,904,232 A * | 2/1990 | Kitahama et al. | ............ | 474/238 |
| 5,120,281 A * | 6/1992 | Mishima et al. | ............... | 474/263 |
| 5,230,668 A * | 7/1993 | Kawashima et al. | ......... | 474/263 |
| 5,427,637 A * | 6/1995 | Mishima et al. | .............. | 156/137 |
| 5,674,143 A * | 10/1997 | Kumazaki et al. | ............. | 474/263 |
| 5,904,630 A * | 5/1999 | Berthelier | ..................... | 474/263 |
| 6,358,171 B1 * | 3/2002 | Whitfield | ....................... | 474/266 |
| 6,435,997 B1 * | 8/2002 | Kurose et al. | .................. | 474/263 |
| 6,491,598 B1 * | 12/2002 | Rosenboom | ................... | 474/260 |
| 6,511,394 B2 * | 1/2003 | Okuno et al. | .................. | 474/260 |
| 6,695,735 B2 * | 2/2004 | Tani et al. | ...................... | 474/263 |
| 6,758,779 B2 * | 7/2004 | Fujimoto | ....................... | 474/260 |
| 6,793,599 B2 * | 9/2004 | Patterson et al. | ............. | 474/260 |
| 6,855,082 B2 * | 2/2005 | Moncrief et al. | .............. | 474/263 |
| 2002/0004434 A1 * | 1/2002 | Tani et al. | ...................... | 474/263 |
| 2002/0032091 A1 * | 3/2002 | Okuno et al. | .................. | 474/260 |
| 2003/0017900 A1 * | 1/2003 | Kopang | ......................... | 474/260 |
| 2003/0027920 A1 * | 2/2003 | Kinoshita et al. | ............. | 524/508 |
| 2003/0087715 A1 * | 5/2003 | Fujimoto | ....................... | 474/237 |
| 2003/0139242 A1 * | 7/2003 | Teves et al. | .................... | 474/263 |
| 2004/0018906 A1 * | 1/2004 | Sedlacek | ......................... | 474/260 |
| 2005/0003918 A1 * | 1/2005 | Hayashi | ........................ | 474/263 |
| 2005/0143209 A1 * | 6/2005 | Shibutani | ...................... | 474/260 |

FOREIGN PATENT DOCUMENTS

| | | |
|---|---|---|
| JP | 3-265741 A | 11/1991 |
| JP | 6-21607 B2 | 3/1994 |
| JP | 2006-97724 A | 4/2006 |
| JP | 2006-144988 A | 6/2006 |

OTHER PUBLICATIONS

Nylon Plastics Handbook. Kohan, Melvin I. Hanser Publishers, 1995. p. 71.*
Office Action issued by Japanese Patent Office, Patent Application No. 2006-206850, Dated Aug. 5, 2008.

* cited by examiner

*Primary Examiner* — Robert A Siconolfi
*Assistant Examiner* — Stephen Bowes
(74) *Attorney, Agent, or Firm* — Roberts Mlotkowski Safran & Cole P.C.

(57) ABSTRACT

Short fibers 6a protruded from side faces 5a of rubber ribs 5 are thermal contracted by frictional heat by belt slip of the rubber rib side faces 5 on a V groove face of a pulley. This allows the short fibers 6a to be buried in rubber ribs 5.

8 Claims, 3 Drawing Sheets

V-RIBBED BELT

CROSS REFERENCE TO RELATED APPLICATIONS

This Non-provisional application claims priority under 35 U.S.C. §119(a) on Patent Application No. 2006-206850 filed in Japan on Jul. 28, 2006, the entire contents of which are hereby incorporated by reference.

BACKGROUND OF THE INVENTION

1. Field of the Invention

The present invention relates to a V-ribbed belt for power transmission wound to, for example, a DL (Damper & Limiter) pulley used for air conditioner (A/C) compressors of automobiles, and belongs to a technical field for preventing belt breakage caused due to locking of the pulley.

2. Background Art

Conventionally, auxiliaries and the like of an automobile are driven in such a manner that power from an engine crank shaft is transmitted through a transmission belt, such as a V-ribbed belt or the like. The V-ribbed belt is in contact on the side faces of rubber ribs thereof with a V groove face of the pulley to generate frictional force utilized for power transmission. In general, the winding angle to a pulley and the tension of a belt are determined from the engine layout, and the apparent coefficient of dynamic friction of the belt to the pulley is determined accordingly. When the apparent coefficient of dynamic friction is large, noise is generated. To tackling this problem, as indicated in Japanese Patent Publication No. 6-21607, a V-ribbed belt is well known in which short fibers are blended in the rubber ribs and part thereof are allowed to be protruded from the side faces of the rubber ribs (hereinafter, these short fibers are called protruded short fibers) to reduce the contact area between the side faces of the rubber ribs and the V groove face of the pulley, thereby reducing the frictional force.

Recent demands for lightweight and compact automobile engines leads to major employment of a generally-called serpentine belt drive in which engine auxiliaries are driven through a single belt. In association therewith, it grows more significant than ever before to provide countermeasures to prevent belt breakage. Heretofore, two or three belts were wound to one crank pulley to drive different auxiliary groups, and therefore, not all of auxiliary groups were stopped upon breakage of one of the belts. In contrast, belt breakage results in stop of every auxiliary group in the serpentine belt drive. This may leads to significant trouble in running, for example, trouble in engine seizing.

In view of fuel saving, power consumption saving, accelerating ability, shock reduction, and the like, recently, variable capacity compressors requiring no on-off operation mechanism of a clutch mechanism have been employed as air conditioner (A/C) compressors of automobiles. A torque limiter mechanism for preventing breakage of a V-ribbed belt is incorporated in the variable capacity compressors. An operation process of the torque limiter mechanism is as follows. Though some factor locks (fixes non-rotatably) the drive shaft of the compressor, the belt is forcedly driven still by rotation of the crank pulley (a drive pulley) mounted on the engine crank shaft, thereby causing belt to slip on a driven pulley, for example, a DL pulley. Strictly, the side faces of the rubber ribs slips on the V groove face of a pulley (hereinafter, slip start is called belt slip and before and after it are called before belt slip and after belt slip, respectively), so that a torque in the peripheral direction applied to the DL pulley increases. When the torque exceeds a predetermined value of the torque limiter mechanism, the torque limiter mechanism operates. The operation of the torque limiter mechanism breaks a limiter portion (breaking portion) thereof connecting the DL pulley and the drive shaft of the compressor to allow the DL pulley to idle, so that the belt is inhibited from slipping on the DL pulley. This mechanism prevents belt breakage caused due to heat generated at the slip face of the side faces of the rubber ribs against the pulley V groove face of the pulley.

In conventional belts, the apparent coefficient of dynamic friction of the side faces of the rubber ribs against the V groove face of the pulley is set low for suppressing noise generation by increasing the number of the protruded short fibers. Accordingly, it takes time until the influence of the short fibers is ceased though the number of the protruded short fibers is reduced after belt slip due to abrasion, fall-off, and breakage. Namely, a time period is long until the apparent coefficient of dynamic friction is increased by an increase in contact area between the side faces of the rubber ribs and the V groove face of the pulley, and therefore, belt breakage is caused by heat generated at the slip face before the apparent coefficient of dynamic friction reaches a value at which a torque necessary for limiter operation is generated.

SUMMARY OF THE INVENTION

The present invention has been made in view of the foregoing and has its object of providing a V-ribbed belt for transmitting frictional force by being in contact with a V groove of a driven pulley, which keeps the apparent coefficient of dynamic friction of the side faces of rubber ribs against a V grooved face of the pulley low in normal driving operation while increasing the apparent coefficient of dynamic friction earlier after the belt starts slipping (after belt slip) due to locking of the driven pulley by providing a scheme to the rubber ribs of the V-ribbed belt. In other words, the object is to provide a V-ribbed belt capable of suppressing noise generation by keeping the apparent coefficient of dynamic friction low in normal driving operation and of preventing belt breakage by allowing a torque limiter mechanism for the driven pulley to operate earlier and definitely after belt slip.

To achieve the above object, the present invention provides a structure in which short fibers (protruded short fibers) protruded from the side faces of the rubber ribs are thermal contracted in the longitudinal direction thereof by heat generated at the slip face so that each protruded part of the protruded short fibers is buried in the rubber ribs.

Specifically, the first aspect of the present invention is directed to a V-ribbed belt including a plurality of V-shaped rubber ribs extending in a longitudinal direction of the belt and arranged in a widthwise direction of the belt, short fibers blended in the rubber ribs, part of the short fibers being protruded from side faces of the rubber ribs.

Wherein, under a state where the V-ribbed belt is wound between a drive pulley and a driven pulley and is driven by the drive pulley, when the side faces of the rubber ribs slip on a V groove face of the driven pulley in contact with the side faces of the rubber ribs upon non-rotatable fixation of the driven pulley, number of the short fibers protruded from the side faces of the rubber ribs decreases in such a way that at least part of the short fibers protruded from the side faces of the rubber ribs is thermal contracted in a longitudinal direction of the short fibers by heat generated at a face where slip occurs and is buried in the rubber ribs.

With the above arrangement, the apparent coefficient of dynamic friction can be kept low before belt slip and increases high after belt slip. Specifically, decrease in the number of the short fibers protruded from the side faces of the rubber ribs after belt slip increases the contact area between the side faces of the rubber ribs and the V groove face of the driven pulley earlier to increase the apparent coefficient of dynamic friction. For example, in the case where the belt is applied to a DL pulley for driving an A/C compressor including a torque limiter mechanism, an increase in apparent coefficient of dynamic friction increases the torque in the peripheral direction working on the DL pulley to allow the torque limiter mechanism to operate early and definitely. This causes the DL pulley to idle to suppress frictional heat generated due to slip of the belt on the pulley. Hence, belt breakage caused due to the frictional heat can be prevented. Specifically, heat hardens the rubber of a belt to lower the flexibility, and accordingly, repetitive bending and stretching by rotations leads to formation of a crack in the belt. The core cords of the belt contribute to almost all part of the belt strength. Accordingly, though such a crack less lowers the belt strength, the crack will develop to the adhesion layer and spread in the peripheral direction to lead to transmission failure and damage by exposure of a core cord, thereby leading to belt breakage. The present invention provides means for solving these problems.

In the above V-ribbed belt, it is preferably that when the side faces of the rubber ribs slip on the V groove face of the driven pulley in contact with the side faces of the rubber ribs upon non-rotatable fixation of the driven pulley, decrease in the number of the short fibers protruded from the side faces of the rubber ribs increases double or more an apparent coefficient of dynamic friction of the side faces of the rubber ribs with respect to the V groove face of the driven pulley.

In the above arrangement, the apparent coefficient of dynamic friction after belt slip is increased double or more of that before belt slip, so that the torque limiter mechanism operates definitely when applied to a DL pulley, for example. In setting a predetermined torque value of the DL pulley, a sufficient margin can be set for the torque in the peripheral direction (strictly, a maximum value of the torque in the peripheral direction) working on the DL pulley before slip, that is, in normal driving operation, thereby preventing misoperation. If an increasing rate of the apparent coefficient of dynamic friction is small, a sufficient margin cannot be set in setting the predetermined torque value to involve the following problems. First, attachment of water, dust, or the like to the belt in normal driving operation may cause belt slip to invite an instant torque increase, of which torque increasing rate is smaller than that in the case where the driven pulley is locked fully. Even such a small torque increase, which is not critical to the belt or which does not lead to belt breakage), may cause the torque limiter mechanism to operate. Secondly, the predetermined torque value must be set small, which forces lowering of the breaking strength of the limiter portion, thereby lowering the fatigue resistance of the limiter portion to lower the durability of the torque limiter mechanism. The present invention provides means for solving the above problems.

In the above V-ribbed belt, the short fibers preferably have a melting point in a range between 200° C. and 270° C., both inclusive.

With the above arrangement, the short fibers are softened or dissolved by heat generation after belt slip. Slip of the belt on the driven pulley applies shearing force to the short fibers, which have been softened, so that the short fibers can be cut readily. The dissolved short fibers fly readily. Namely, remaining protruded short fibers, which cannot have been buried by the operation of the first aspect, are cut or allowed to fly to decrease further the number of the protruded short fibers after belt slip.

Preferably, in the above V-ribbed belt, the short fibers are made of nylon short fiber.

With the above arrangement, heat generation after belt slip promotes crystallization of the nylon short fibers to thermal contract the short fibers. Further, the nylon short fibers, which have thermal plasticity, are dissolved or softened by heat. The nylon short fibers have an elastic modulus higher than a rubber part of the rubber ribs (hereinafter the side faces of the rubber ribs from which the short fibers are excluded is referred to as a rubber part), and accordingly, abrasion of the rubber part progresses earlier to maintain protrusion of the nylon short fibers.

In the V-ribbed belt, it is preferable that the nylon short fibers are set to have a length in a range between 0.5 mm and 5 mm, both inclusive and a blended amount of the nylon short fibers are set in a range between 10 phr and 30 phr.

In the above arrangement, the length of the short fibers is set equal to or smaller than 0.5 mm to prevent the short fibers from falling off in normal driving operation. With short fibers having a fiber length smaller than 0.5 mm, the short fibers are liable to fall off to increase the apparent coefficient of dynamic friction even in normal driving operation, thereby causing noise. In contrast, with short fibers having a fiber length larger than 5 mm, difficulty is involved in generally-called mulling in which short fibers are mixed and kneaded with a rubber material. The fiber length herein is an average length. When the blended amount of the nylon short fibers is smaller than 10 phr, the number of the protruded short fibers is less to increase the apparent coefficient of dynamic friction in normal driving operation, thereby causing noise. When the blended amount of the nylon short fibers is larger than 30 phr, the number of the protruded short fibers is large, so that the number of protruded short fibers remains large even after belt slip. Hence, the apparent coefficient of dynamic friction may not reach a predetermined value (a value necessary for operating the toque limiter mechanism, for example).

In the V-ribbed belt, the nylon short fibers are preferably set to have a fiber diameter in a range between 10 μm and 30 μm, both inclusive.

With the above arrangement, the protruded short fibers are readily cut after belt slip while being hardly cut in normal driving operation. When the fiber diameter is smaller than 10 μm, the protruded short fibers are cut even in normal driving operation to invite an increase in apparent coefficient of dynamic friction, thereby causing noise. In contrast, when the fiber diameter is larger than 30 μm, they would not be cut after belt slip. Hence, the diameter of the short fibers is preferably set in the range between 10 μm and 30 μm, both inclusive.

Preferably, in the V-ribbed belt, an arithmetic average roughness (Ra) of the side faces of the rubber ribs from which the short fibers are excluded is set in a range between 1 μm and 3 μm, both inclusive.

In the above arrangement, the arithmetic average roughness (Ra) is set in the range between 1 μm and 3 μm, both inclusive, to allow the apparent coefficient of dynamic friction of the side faces of the rubber ribs to increase sharply after belt slip, thereby shortening a time period until the toque limiter mechanism starts operating. Specifically, decreases in the number of the short fibers after belt slip increases the contact area between the side faces of the rubber ribs and the V grove face of the driven pulley to increase influence of the arithmetic average roughness (Ra) of the rubber part at the side faces of the rubber ribs on the apparent coefficient of dynamic friction. Accordingly, the larger the arithmetic average roughness (Ra) of the rubber part of the rubber ribs is, the more sharply the apparent coefficient of dynamic friction increases after belt slip. When the arithmetic average roughness (Ra) is set equal to or smaller than 1 μm, the apparent coefficient of dynamic friction increases gently. In contrast, the arithmetic average roughness (Ra) is set equal to or larger than 3 μm, the apparent coefficient of dynamic friction in normal driving operation also increases to cause noise.

In the V-ribbed belt, the rubber ribs preferably are made of ethylene propylene dien monomer.

The above arrangement prevents the belt function from lowing caused due to heat generated at a slip face. Specifically, when nylon short fibers are softened by heat, rubber having less thermal resistance, such as chloroprene rubber (CR) or the like are carbonized to invite lowering of the belt function. Hence, ethylene propylene dien monomer (EPDM) is employed to increase the thermal resistance.

DESCRIPTION OF THE PREFERRED EMBODIMENT

Embodiments of the present invention will be described below in detail with reference to the accompanying drawings.

Figure 1:
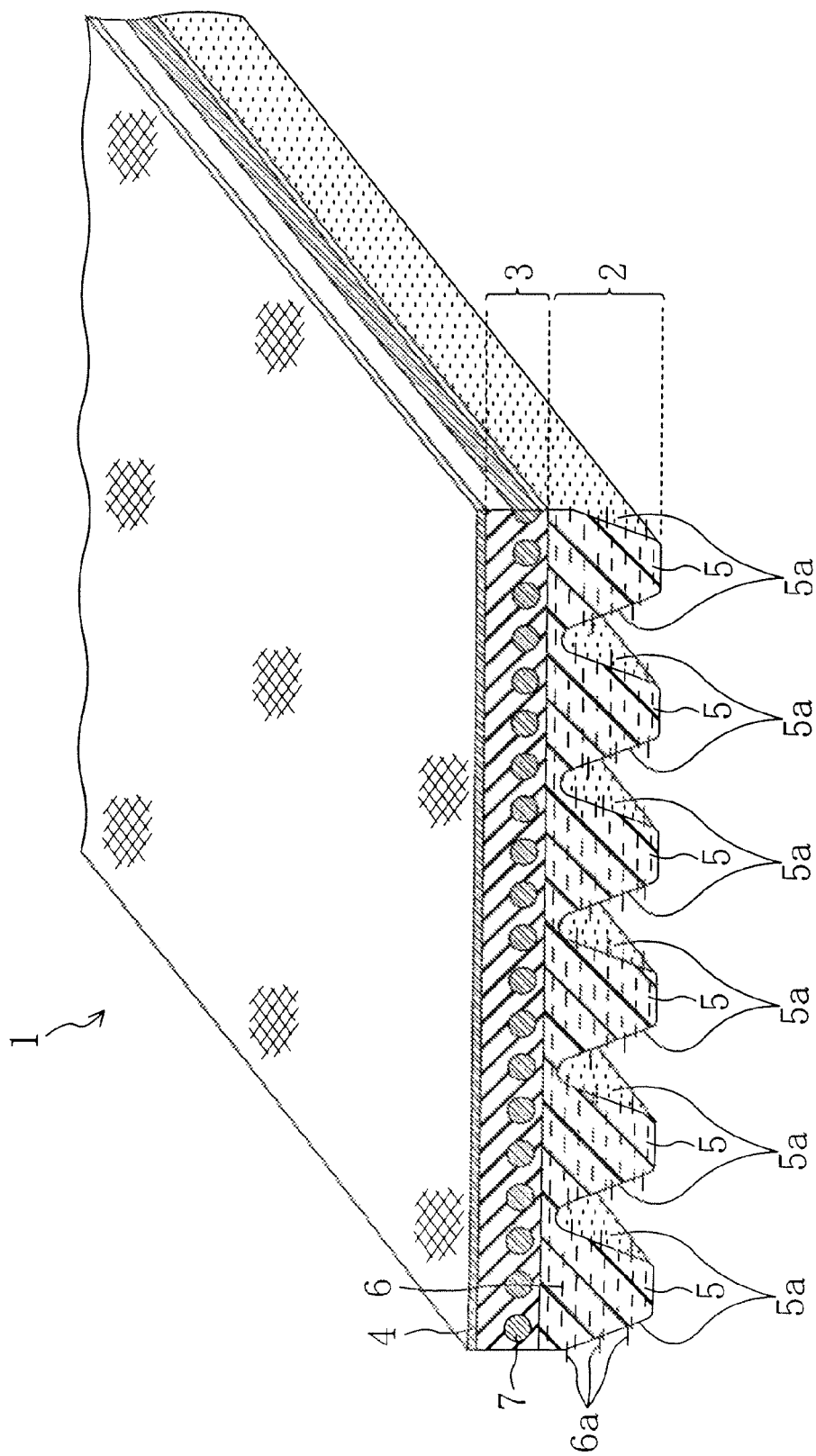
FIG. 1 is a perspective view of a V-ribbed belt in accordance with an embodiment of the present invention.
Figure 2:
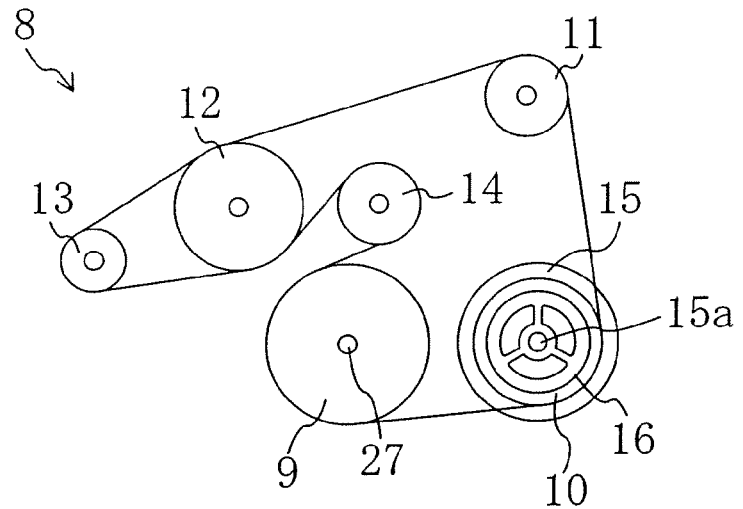
FIG. 2 is a diagram showing a pulley layout of a belt transmission in which the V-ribbed belt in accordance with the embodiment of the present invention is applied.
Figure 3:
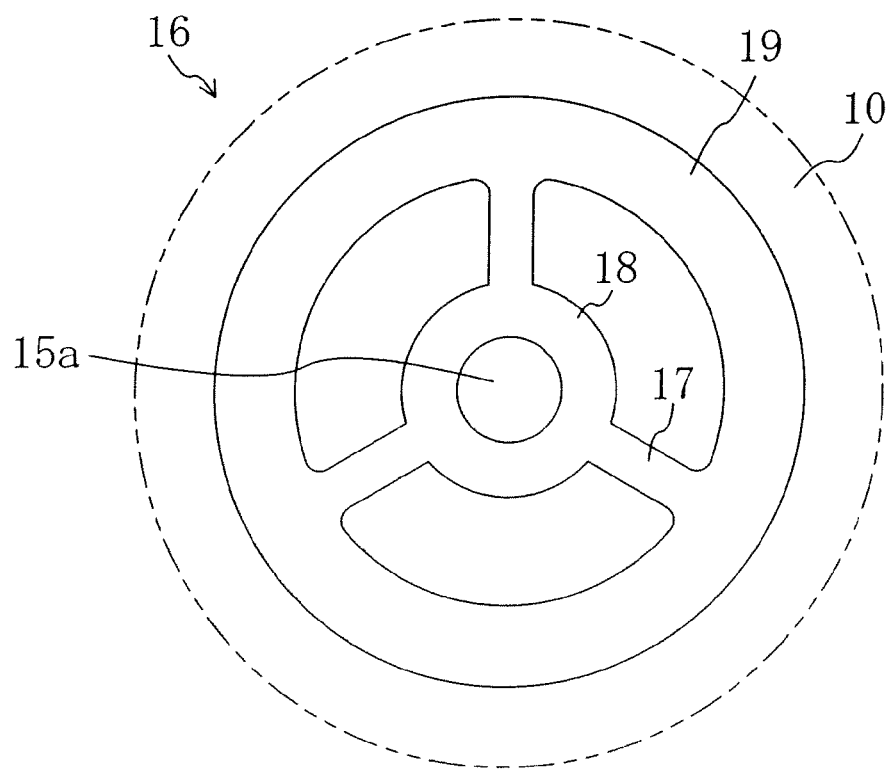
FIG. 3 is a schematic view of a limiter incorporated in a DL pulley.

FIG. 1 shows a structure of a V-ribbed belt 1 in accordance with the present invention. The belt 1 has a peripheral length in the range between 600 mm and 3000 mm, both inclusive, a belt width in the range between 10 mm and 40 mm, both inclusive, and belt thickness in the range between 3.5 mm and 5.5 mm. The V-ribbed belt 1 is applied to a belt transmission system 8 for driving auxiliaries of an automobile including a DL pulley 10 for driving an air conditioner (A/C) compressor, as shown in the schematic diagram of FIG. 2. The V-ribbed belt 1 is wound around a drive pulley and a plurality of driven pulleys. The drive pulley herein is a crank pulley 9 directly connected to an engine crank shaft 27, and the driven pulleys are a DL pulley 10 for the A/C compressor, a pulley 11 for a power steering system, a pulley 12 for a water pump, a pulley 13 for an alternator, and an idle pulley 14. Power from the engine crank shaft 27 is transmitted to each auxiliary through the belt 1. At the DL pulley 10, a torque limiter mechanism 16 for preventing belt breakage is provided, as shown in FIG. 2. Detailed description will be given below to each part of the V-ribbed belt 1.

As shown in FIG. 1, the V-ribbed belt 1 includes a rubber ribbed layer 2, an adhesion rubber layer 3 layered on the back face of the rubber ribbed layer 2, and a back reinforcing fabric 4 provided so as to cover the back face of the adhesion rubber layer 3.

The rubber ribbed layer 2 is made of ethylene propylene dien monomer (hereinafter referred to it as EPDM). The rubber ribbed layer 2 is a portion in contact with the V groove faces of the pulleys for transmitting power and includes a plurality of V-shaped rubber ribs 5 extending in the longitudinal direction of the belt and arranged in the width direction of the belt for increasing the contact area with the V groove faces of the pulleys. Each corner of the rubber ribs 5 is chamfered for avoiding interference with the V groove faces of the pulleys. The number of the rubber ribs 5 is in a general range, for example, between 3 and 12 (six rubber ribs 5 are indicated in FIG. 1). The rubber ribs 5 have a height of 2.5 mm, a V-angle in cross section is 40°, and are arranged at a pitch of 3.56 mm. Multiple nylon short fibers 6 are mixed with and distributed in the rubber ribbed layer 2. Part of the short fibers is protruded from side faces 5a of the rubber ribs 5. The short fibers 6 protruded therefrom are called protruded short fibers 6a (hereinafter the short fibers 6 include the protruded short fibers 6a). The arithmetic average roughness (Ra) of the rubber part at the side faces 5a of the rubber ribs 5, that is, the side faces 5a of the rubber ribs 5 from which the protruded short fibers 6a are excluded is set between the range between 1 μm and 3 μm, both inclusive, and the coefficient of dynamic friction of the rubber part is set at 1.0±0.4 under a predetermined condition, which will be described later. The apparent coefficient of dynamic friction of the side faces 5a of the rubber ribs 5 before belt slip under a predetermined condition, which will be described later, is 0.9±0.4 and increases up to 2.0±0.5 after belt slip. Preferably, the short fibers 6 are set to have a fiber length in the range between 0.5 mm and 5 mm, both inclusive, and a fiber diameter in the range between 10 μm and 30 μm, both inclusive. Further, the blended amount of the short fibers 6 is preferably set in the range between 10 phr and 30 phr, both inclusive.

Figure 4:
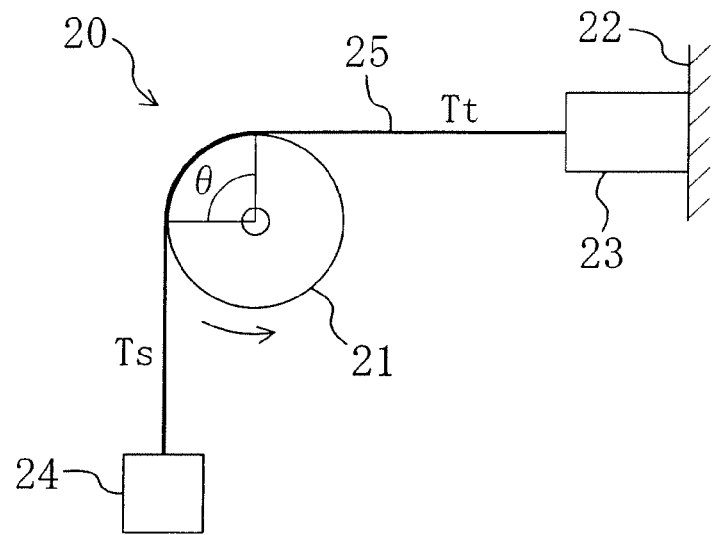
FIG. 4 is a schematic constitutional view of a belt friction tester.

The apparent coefficient of dynamic friction means a coefficient of dynamic friction corrected with the wedging effect of the V-ribbed belt 1 with respect to a pulley taken into consideration, and method and conditions for measuring the apparent coefficient thereof will be described with reference to FIG. 4. FIG. 4 shows a schematic construction of a belt friction tester.

First, a test piece in a strap shape is cut out from the belt 1, and the central part of the cut piece is wound to a pulley 21 having a predetermined pulley diameter in such a fashion that one end thereof is extended and fixed to a load cell 23 mounted at a fixed body 22 while the other end thereof is set to hang a load 24. A tension Ts is applied to a part of the belt 1 from which the load 24 is hung. The winding angle of the belt 1 to the pulley 21 is θ.

Subsequently, under this state, the pulley 21 is driven and rotated in the direction (anticlockwise in FIG. 4) where the tension is applied to the part of the belt 1 which is fixed to the load cell 23 at a rotational speed (slip velocity) within a predetermined range while the tension Ts of the load 24 which is applied to the part of the belt 1 which is fixed to the load 24 is kept constant. Then, the tension detected by the load cell 23 in slipping (skidding) of the belt 1 on the pulley 21 is read. The tension detected by the load cell 23 is represented by Tt.

Supposing that the apparent coefficient of dynamic friction is represented by μ', $$\exp(\mu'\theta)=Tt/Ts$$

is held from Eulerian equation.

This leads to:

$$\mu'=\ln(Tt/Ts)/\theta.$$

Specifically, the pulley diameter φ of the pulley 21 is set at 60 mm. The pulley is made of iron and has a V groove angle of 40°, and the arithmetic average roughness (Ra) of the V groove face thereof is in the range between 1.6 μm and 6.3 μm, both inclusive. The load 24 is fixed to 17.15 N, and the pulley 21 is driven and rotated by an electric motor at a rotational speed (slip velocity) in the range between 0.05 and 0.35 m/sec. A tension value detected by the load cell 23 in slipping of the V-ribbed belt 1 on the pulley 21 is read. The "slip velocity" means difference in rotational speed between the V-ribbed belt 1 and the pulley 21 which is caused accompanied by torque transmission therebetween, and is set at a value obtained by multiplying a rotational speed of an engine by a given coefficient in general. The apparent coefficient μ' of dynamic friction is calculated from a tension value (N) detected by the load cell 23 on the basis of the following equation:

$$\mu'=2/\pi \times \ln \text{ (a tension value of the load cell 23 divided by 17.15).}$$

Wherein, the apparent coefficient of dynamic friction before belt slip in the present embodiment is an apparent coefficient of dynamic friction calculated from a value of the load cell 23 when the above measurement starts, and is 0.9±0.4. The apparent coefficient of dynamic friction after belt slip in the present embodiment is an apparent coefficient of dynamic friction calculated from a value when the value of the load cell 23 increases and reaches a steady state, and is 2.0±0.4.

Figure 5:
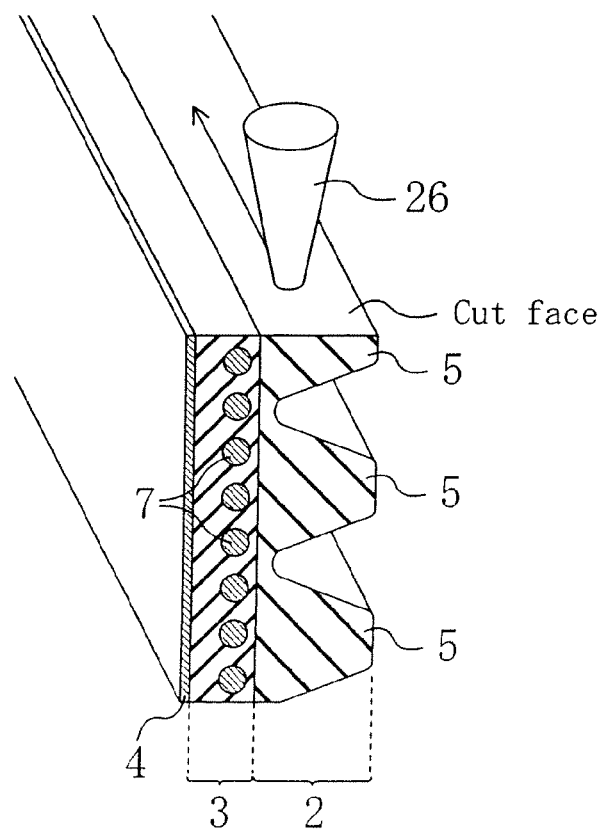
FIG. 5 is an explanatory drawing for explaining a method of measuring a coefficient of dynamic friction.

Description will also be given with reference to FIG. 5 to method and conditions for measuring the coefficient of dynamic friction μ of the rubber part at the side faces 5a of the rubber ribs 5. First, the belt 1 is cut along the transmission face to form a cut face having an arithmetic average roughness (Ra) in the range between 1 μm and 3 μm, both inclusive. Then, a steeple end of a friction resistance detection member 26 in a conical shape made of SUS304 is allowed to abut on the cut face at a pressure of 0.11 MPa (pressure of 0.196 N is applied from the other end thereof, that is, the circular contact face having a diameter of 1.5 mm) and to slide at a speed of 25 mm per minute for 30 seconds. Then, the coefficient of dynamic friction is calculated by dividing the frictional resistance detected by a load cell connected to the friction resistance detection member 26 (event type abrasion measuring tool, for example) by the pressure that the friction resistance detection member 26 receives. The sliding face of the friction resistance detection member 26 is set to have an arithmetic average roughness (Ra) in the range between 1.6 μm and 6.3 μm, both inclusive.

Referring to the adhesion rubber layer 3, it is layered on the back face of the rubber ribbed layer 2 and includes inside thereof a core cords 7 as a tensile member. Alternatively, the adhesion rubber layer 3 is made of EPDM, similarly to the rubber fibbed layer 2. The adhesion rubber layer 3 may be made of chloroprene-based rubber generally used in belts, such as chloroprene (CR), alkylated chlorosulfonated polyethylene (ACSM), hydrogenated rubber of ethylene unsaturated nitrile-conjugated dien interpolymer, or the like.

The core cords 7 are extended in the longitudinal direction of the belt and embedded at regular intervals in the widthwise direction of the belt. Each core cord 7 is formed of a twist yarn of polyethylene terephthalate fiber (PET) or poly(ethylene naphthalate) fiber (PEN) and is a plied yarn obtained in such a manner that a plurality of single twist yarns where each yarn of 400 to 8000 dex in total is Z-twisted or S-twisted in one direction by a predetermined twist number or a plurality of first twist yarns where each yarn of 2000 to 3000 dex in total is Z-twisted or S-twisted in one direction by a predetermined twist number are gathered and final twisted in the reverse direction to the first twist by the same twist number as the first twist yarns. In order to allow the yarns for the core cords 7 to have adhesive property with respect to the adhesion rubber layer 3, the yarns for the core cords 7 are subjected, before twisting, to drawing and heat fixation treatment in which the yarns are soaked into a RFL solution and are then drawn and heated and treatment in which the resultant yarns are soaked in a rubber cement and are then dried.

The back face reinforcing fabric 4 is layered on the back face of the adhesion rubber layer 3. The fabric is made of nylon fiber or polyester fiber (PET) and is composed of a woven fabric of plain weave or the like of warp and weft, for example. In order to allow the fabric to have adhesive property, the fabric forming the back face reinforcing fabric 4 is subjected, before formation of the reinforcing fabric, to heat treatment in which the fabric is soaked in a RFL solution and is then heated and treatment in which a rubber cement is coated on the surface of the resultant fabric which is to serve as an adhesion face to the adhesion rubber layer 3 and is dried.

In the thus structured V-ribbed belt 1, when some factor fixes (locks) a driven pulley non-rotatably, the short nylon fibers 6a protruded from the side faces 5a of the rubber ribs 5 are thermal contracted by heat generated at the slipping face to be buried in the rubber ribs 5 after the side faces 5a of the rubber ribs 5 slip on the V groove face of the pulley (after belt slip). The heat also softens and or dissolves the protruded short fibers 6a to allow the protruded short fibers 6a to be cut or fly to decrease the number of the protruded short fibers 6a earlier, so that the apparent coefficient of dynamic friction of the side faces 5a of the rubber ribs 5 under the predetermined conditions increases from 0.9±0.4 to 2.0±0.5. A process of this friction increase will be described in detail. After belt slip, the temperature of the slip face rises sharply by the friction at the slip face to reach in the range between 200° C. and 270° C. The nylon short fibers 6 are crystallized and is thermal contracted in the longitudinal direction thereof as the temperature rises. This allows part of protruded short fibers 6a of which protrusion length is short to be fully buried in the rubber ribs 5. In contrast, the other protruded short fibers 6a of which protrusion length is long are not buried fully in the rubber ribs 5 to be cut and removed dominantly by the shearing force in the tangential direction at the slip face. The softening point of nylon is 180° C. Accordingly, when the temperature of the slip face exceeds 180° C., the protruded short fibers 6a are softened and are readily cut by the shearing force. Due to less rigidity, however, the softened protruded short fibers 6a could not be cut at the bottom thereof, namely, at the side faces 5a of the rubber ribs 5, so that short fibers 6a of which protrusion length becomes short remain. The remaining protruded short fibers 6a, however, will be fully buried in the rubber ribs 5 by thermal contraction of themselves as described above. When the temperature further rises and reaches a melting point, for example, 215° C. in the case of nylon 6 or 250° C. in the case of nylon 66, the remaining protruded short fibers 6a, which have not been removed by thermal contraction or by being softened and cut, are dissolved and fly, with a result that almost all of the protruded short fibers 6a present at belt slip are removed. This increases the contact area between the side faces 5a of the rubber ribs 5 and the V groove face of a pulley to increase the apparent coefficient of dynamic friction. Thus, in the present embodiment, when the DL pulley 10 is locked, the belt 1 slips on the DL pulley 10 to increase the torque in the peripheral direction working on the DL pulley 10, thereby allowing the torque limiter mechanism 16 provided at the DL pulley 10 to operate definitely. When the torque in the peripheral direction working on the DL pulley 10 is increased over a predetermined torque value of the torque limiter mechanism 16, the limiter portion 17 (braking portion) connecting the DL pulley 10 and the compressor drive shaft 15 is broken to cause the DL pulley 10 to idle. Accordingly, the side faces 5a of the rubber ribs 5 is inhibited from slipping on the V groove face of the DL pulley 10, thereby preventing belt breakage caused due to heat generated at the slip face.

Further, the arithmetic average roughness (Ra) of the rubber part, namely, the side faces 5a of the rubber ribs 5 from which the protruded short fibers 6a are excluded is set within the range between 1 µm and 3 µm, both inclusive and the coefficient of dynamic friction under the aforementioned conditions is set high at 1.0±0.4. This makes a sharp increase in apparent coefficient of dynamic friction at an increase in contact area between the side faces 5a of the rubber ribs 5 and the V grove face of a pulley in association with decrease in the number of the protruded short fibers 6a. Hence, the torque limiter mechanism 16 operates earlier after belt slip, so that the slip face of the belt 1 is heated for a shorter period of time to invite no degradation of the rubber composition, which is effective in preventing breakage of the belt 1.

The length and the diameter of the short fibers are set in the range between 0.5 mm and 5.0 mm, both inclusive, and in the range between 10 µm and 30 µm, both inclusive, respectively. Accordingly, the protruded short fibers 6a are readily cut and fly after belt slip to decrease the number of the remaining protruded short fibers 6a and to contribute to an increase in apparent coefficient of dynamic friction. In addition, the blended amount of the short fibers 6a is set in the range between 10 phr and 30 phr, both inclusive, so that the apparent coefficient of dynamic friction is kept low in normal driving operation and is increased after belt slip definitely to a value at which the torque limiter mechanism 16 operates.

Since the nylon short fibers 6 have an elastic modulus higher than EPDM as the material of the rubber ribs 5, abrasion of the side faces 5a of the rubber ribs 5 progresses earlier in normal driving operation to maintain protrusion of the nylon short fibers 6a protrude from the side faces 5a of the rubber ribs 5. Employment of EPDM as the material of the rubber ribbed layer 2 also contemplates enhancement of thermal resistance against heat generated at a slip face.

ANOTHER EMBODIMENT

While the above embodiment is applied to a V-ribbed belt in which the rubber ribbed layer 2 is formed on one side of the belt, the present invention is applicable to a generally-called double V-ribbed belt in which the rubber ribbed layer 2 is formed on each face of the belt.

What is claimed is:

1. A V-ribbed belt comprising a plurality of V-shaped rubber ribs extending in a longitudinal direction of the belt and arranged in a widthwise direction of the belt, short fibers blended in the rubber ribs, such that part of the short fibers protrude from side faces of the rubber ribs, the protruded short fibers being linear and extending straight from said side faces, wherein a diameter of the short fibers is constant throughout the entire length of said fibers, and the side faces of the rubber ribs from which the short fibers are excluded has an arithmetic average roughness (Ra) between 1 µm and 3 µm, both inclusive, and wherein under a state where the V-ribbed belt is wound between a drive pulley and a driven pulley and is driven by the drive pulley, when the side faces of the rubber ribs slip on a V groove face of the driven pulley in contact with the side faces of the rubber ribs upon non-rotatable fixation of the driven pulley, a number of the protruding parts of the short fibers thermally contract in a lengthwise direction of the short fibers as a result of heat generated at a face where slip occurs such that said protruding parts are buried in the rubber ribs, and a coefficient of dynamic friction increases double or more between the side surfaces of the rubber ribs and the V groove face of the driven pulley, and wherein the short fibers have a melting point in a range between 200° C. and 270° C., both inclusive.

2. The V-ribbed belt of claim 1 wherein the short fibers are made of nylon short fiber.

3. The V-ribbed belt of claim 2, wherein the nylon short fibers are set to have a length in a range between 0.5 mm and 5 mm, both inclusive, and a blended amount of the nylon short fibers are set in a range between 10 phr and 30 phr.

4. The V-ribbed belt of claim 2, wherein the nylon short fibers are set to have a fiber diameter in a range between 10 µm and 30 µm, both inclusive.

5. The V-ribbed belt of claim 1, wherein the rubber ribs are made of ethylene propylene dien monomer.

6. The V-ribbed belt of claim 1, wherein the nylon short fibers are set to have a fiber diameter in a range between 10 µm and 30 µm, both inclusive.

7. A V-ribbed belt comprising a plurality of V-shaped rubber ribs extending in a longitudinal direction of the belt and arranged in a widthwise direction of the belt, short fibers blended in the rubber ribs, such that part of the short fibers protrude from side faces of the rubber ribs, the protruded short fibers being linear and extending straight from said side faces, wherein a diameter of the short fibers is constant throughout the entire length of said fibers and ranges between 10 µm and 30 µm, the short fibers have a melting point in a range between 200° C. and 270 C inclusive, and the side faces of the rubber ribs where the short fibers are excluded have an arithmetic average roughness (Ra) in a range between 1 µm and 3 µm, inclusive, and wherein under a state where the V-ribbed belt is wound between a drive pulley and a driven pulley and is driven by the drive pulley, when the side faces of the rubber ribs slip on a V groove face of the driven pulley in contact with the side faces of the rubber ribs upon non-rotatable fixation of the driven pulley, a number of the protruding parts of the short fibers thermally contract in a lengthwise direction of the short fibers as a result of heat generated at a face where slip occurs such that said protruding parts are buried in the rubber ribs, and a coefficient of dynamic friction increases double or more between the side surfaces of the rubber ribs and the V groove face of the driven pulley.

8. A belt transmission device, comprising a V-ribbed belt including a plurality of V-shaped rubber ribs extending in a longitudinal direction of the belt and arranged in a widthwise direction of the belt, short fibers blended in the rubber ribs, such that part of the short fibers protrude from side faces of the rubber ribs, the protruded short fibers being linear and extending straight from said side faces, wherein a diameter of the short fibers is constant throughout the entire length of said fibers, and the side faces of the rubber ribs from which the short fibers are excluded has an arithmetic average roughness (Ra) between 1 µm and 3 µm, both inclusive, wherein the short fibers have a melting point in a range between 200° C. and 270° C., both inclusive;

a drive pulley; and a driven pulley between which the V-ribbed belt is wound, wherein the driven pulley is provided with a limiter mechanism for causing the driven pulley to idle when a torque in a peripheral direction which is more than a predetermined torque is applied to the driven pulley, and the V-ribbed belt is configured such that, under a state where the V-ribbed belt is wound between the drive pulley and the driven pulley and is driven by the drive pulley, when the side faces of the rubber ribs slip on a V groove face of the driven pulley in contact with the side faces of the rubber ribs upon non-rotatable fixation of the driven pulley, a number of the short fibers protruded from the side faces of the rubber ribs decreases in such a way that at least part of the short fibers protruded from the side faces of the rubber ribs is thermal contracted in a longitudinal direction of the short fibers by heat generated at a face where slip occurs and is buried in the rubber ribs, such that an apparent coefficient of dynamic friction increases double or more between the side faces of the rubber ribs and the V groove face of the driven pulley, and the driven pulley is configured such that, under a state where the apparent coefficient of dynamic friction increases double or more due to the slip, a torque in a peripheral direction which is more than a predetermined torque is applied to the driven pulley due to the friction, and the limiter mechanism is operated, thereby causing the driven pulley to idle.

\* \* \* \* \*